(12) United States Patent
Sathianarayanan et al.

(10) Patent No.: US 11,379,348 B2
(45) Date of Patent: Jul. 5, 2022

(54) SYSTEM AND METHOD FOR PERFORMING AUTOMATED API TESTS

(71) Applicant: ProKarma Inc., Omaha, NE (US)

(72) Inventors: Ramanathan Sathianarayanan, Dublin, CA (US); Krishna Bharath Kashyap, Telangana (IN)

(73) Assignee: ProKarma Inc., Omaha, NE (US)

( * ) Notice: Subject to any disclaimer, the term of this patent is extended or adjusted under 35 U.S.C. 154(b) by 0 days.

(21) Appl. No.: 16/583,110

(22) Filed: Sep. 25, 2019

(65) Prior Publication Data

US 2020/0401506 A1 Dec. 24, 2020

Related U.S. Application Data

(60) Provisional application No. 62/865,072, filed on Jun. 21, 2019.

(51) Int. Cl.
| G06F 11/36 | (2006.01) |
| G06F 16/955 | (2019.01) |
| G06F 9/54 | (2006.01) |

(52) U.S. Cl.
CPC ............ *G06F 11/3688* (2013.01); *G06F 9/54* (2013.01); *G06F 16/955* (2019.01)

(58) Field of Classification Search
None
See application file for complete search history.

(56) References Cited

U.S. PATENT DOCUMENTS

| 7,506,312 B1 * | 3/2009 | Girolami-Rose | ......... G06F 8/71 717/101 |
| 8,146,057 B1 * | 3/2012 | Michelsen | .......... G06F 11/3696 717/124 |
| 8,745,641 B1 * | 6/2014 | Coker | ................. G06F 11/3668 719/318 |
| 9,189,369 B1 * | 11/2015 | Giardina | ............. G06F 11/3668 |

(Continued)

OTHER PUBLICATIONS

A. Arcuri, "RESTful API Automated Test Case Generation," 2017 IEEE International Conference on Software Quality, Reliability and Security (QRS), Prague, 2017, pp. 9-20, doi: 10.1109/QRS.2017.11. (Year: 2017).*

(Continued)

*Primary Examiner* — Andrew M. Lyons
(74) *Attorney, Agent, or Firm* — Morgan, Lewis & Bockius LLP

(57) ABSTRACT

A framework and a method for ad-hoc batch testing of APIs are provided, where batches of API calls are dynamically generated directly through the framework according inputs identifying the required tests and the sources of the test data, rather than through execution of prewritten test scripts that explicitly write out the test API calls in preset sequences. When performing the validation for an API test, a test payload is generated for the test, an endpoint is called using the test payload to obtain the response used for validation, where generating the test payload includes determining an API reference corresponding to the test, obtaining relevant data from the test data according to a reference key in the test, generating input assignment operations for one or more input parameters in the API reference according to the relevant data, and generating an API call based on the API reference.

24 Claims, 16 Drawing Sheets

(56) References Cited

U.S. PATENT DOCUMENTS

| | | | | |
|---|---|---|---|---|
| 10,133,650 | B1* | 11/2018 | Park | G06F 11/3608 |
| 10,540,270 | B1* | 1/2020 | Surkatty | G06F 11/3688 |
| 10,678,679 | B1* | 6/2020 | Sonawale | G06F 11/3684 |
| 2012/0110580 | A1* | 5/2012 | Ghosh | G06F 11/3608 718/100 |
| 2013/0174126 | A1* | 7/2013 | Belihomji | G06F 11/3668 717/127 |
| 2013/0275946 | A1* | 10/2013 | Pustovit | G06F 11/3684 717/124 |
| 2013/0318402 | A1* | 11/2013 | Rapp | G06F 11/3672 714/38.1 |
| 2014/0289699 | A1* | 9/2014 | Paterson | G06F 11/3684 717/106 |
| 2014/0359581 | A1* | 12/2014 | Soshin | G06F 11/3688 717/126 |
| 2014/0372985 | A1* | 12/2014 | Levin | G06F 11/3608 717/126 |
| 2015/0331733 | A1* | 11/2015 | Channagiri | G06F 11/3688 714/33 |
| 2016/0299936 | A1* | 10/2016 | Chavda | H04L 67/02 |
| 2017/0075784 | A1* | 3/2017 | Nakanishi | G06F 11/263 |
| 2018/0314622 | A1* | 11/2018 | Lowe | G06F 9/44526 |
| 2019/0188119 | A1* | 6/2019 | Kumarath | G06F 11/3688 |
| 2019/0294527 | A1* | 9/2019 | Teitelbaum | G06F 21/53 |
| 2020/0233793 | A1* | 7/2020 | Ahamed | G06F 9/54 |

OTHER PUBLICATIONS

S. M. Sohan, C. Anslow and F. Maurer, "SpyREST in Action: An Automated RESTful API Documentation Tool," 2015 30th IEEE/ACM International Conference on Automated Software Engineering (ASE), Lincoln, NE, 2015, pp. 813-818, doi: 10.1109/ASE.2015.92. (Year: 2015).*

A. Arcuri, "RESTful API Automated Test Case Generation," 2017 IEEE International Conference on Software Quality, Reliability and Security (QRS), 2017, pp. 9-20, doi: 10.1109/QRS.2017.11. (Year: 2017).*

H. Ed-douibi, J. L. Cánovas Izquierdo and J. Cabot, "Automatic Generation of Test Cases for REST APIs: A Specification-Based Approach," 2018 IEEE 22nd International Enterprise Distributed Object Computing Conference (EDOC), 2018, pp. 181-190, doi: 10.1109/EDOC.2018.00031. (Year: 2018).*

J. Wang, X. Bai, L. Li, Z. Ji and H. Ma, "A Model-Based Framework for Cloud API Testing," 2017 IEEE 41st Annual Computer Software and Applications Conference (COMPSAC), 2017, pp. 60-65, doi: 10.1109/COMPSAC.2017.24. (Year: 2017).*

* cited by examiner

| Id | Feature | APIName | HttpMethod | Endpoint | StatusDescription | SOAPAction | DeleteFlag |
|---|---|---|---|---|---|---|---|
| CareApp_1 | members | MemberLookup | GET | /rest/api/service?memberId={memberId} | 200 | | N |
| CareApp_2 | diagnostics | AddDiagnostics | POST | /rest/api/service/diagnostics | 200 | | N |
| CareApp_3 | inquires | CreateInquiry | POST | /rest/api/service/inquiry | 200 | | N |
| CareApp_4 | inquires | InquiryLookup | GET | /rest/api/service/inquiry?requestId={requestId} | 200 | | N |

TestScenarios / TestCases / RequestValidation / ResponseValidation / APIInventory / TestData

Figure 3B

| | A | B | C | D | E |
|---|---|---|---|---|---|
| | Id | ScenarioName | ExecutionControl | TestCategory | DeleteFlag |
| | CareApp_1 | validateMemberAPIs | Yes | Standard | N |
| | CareApp_2 | validateInquiryAPIs | Yes | Standard | N |

TestScenarios / TestCases / ResponseValidation / APIInventory / TestData

Figure 3C

| Id | TestCaseName | ScenarioName | ScenarioOrder | Feature | TestCaseId | APIInventoryID | TestDataID | ResponseValidationID | DeleteFlag |
|---|---|---|---|---|---|---|---|---|---|
| CareApp_1 | retrieveMemberDetails | validateMemberAPIs | 1 | members | 112 | CareApp_1 | CareApp_1 | CareApp_1 | N |
| CareApp_2 | InsertDiagnosticsData | validateMemberAPIs | 2 | diagnostics | 113 | CareApp_2 | CareApp_2 | CareApp_2 | N |
| CareApp_3 | InsertInquiryRequest | validateInquiryAPIs | 1 | inquires | 114 | CareApp_3 | CareApp_3 | CareApp_3 | N |
| CareApp_4 | validateInquiryRequest | validateInquiryAPIs | 2 | inquires | 115 | CareApp_4 | CareApp_4 | CareApp_4 | N |

Figure 3D

| id | APIName | ScenarioName | SaveVariableName | JSONPath | SQLQueryString | VerifyDataInRow | ResponseElementsValues | DBQueryResponseValidation | DeleteFlag |
|---|---|---|---|---|---|---|---|---|---|
| CoreApp_1 | MemberLookup | validateMemberAPIs | memberID | memberId | NA | NA | healthPlan=CHP,mem=75589745&grpN ame=Mary Smith | NA | N |
| CoreApp_2 | AddDiagnostics | validateMemberAPIs | NA | NA | NA | NA | NA | NA | N |
| CoreApp_3 | CreateInquiry | validateMemberAPIs | requestID | requestId | NA | NA | requestId | NA | N |
| CoreApp_4 | InquiryLookup | validateInquiryAPIs | NA | NA | NA | NA | requestStatus=Requested,memberFirst Name=FirstName,memberLastName=La stName | NA | N |

SYSTEM AND METHOD FOR PERFORMING AUTOMATED API TESTS

PRIORITY CLAIM AND RELATED APPLICATION

The application claims the benefit of U.S. Provisional Application No. 62/865,072, filed Jun. 21, 2019, the content of which is incorporated herein in its entirety.

TECHNICAL FIELD

The present disclosure relates generally to testing frameworks and more specifically to systems and methods that enable ad-hoc batch testing of APIs without relying on individual test scripts.

BACKGROUND

An Application Programming Interface (API) is a set of instructions and standards for accessing various functions of software applications (e.g., web-based software). APIs are an important technology for integration of application software and have thus become ubiquitous. Web APIs are a class of remote APIs that manipulate remote resources (e.g., computer, hardware, and/or databases distinct from the computer executing the APIs). Web APIs typically use HTTP for request messages and provide a structure for response messages (e.g., an XML or JSON file). Protocol specifications (e.g., SOAP) and architectural specifications (e.g., REST) have been developed to help standardize information exchange via Web APIs. With the plethora of Web APIs arises the need for testing the APIs (e.g., written in various API formats). Writing individual test scripts for testing specific APIs is a labor-intensive process. Not only do the test developers have to become familiar with the API formats, they also have to familiarize themselves with the nuances of specific customer code that exercise APIs in more than a trivial number of ways. Consequently, conventional API testing, even automated API testing that are performed through execution of prewritten API test scripts, often leave the APIs inadequately tested due to low-quality test scripts, resulting in buggy software and poor user experience. In addition, the cost for hiring experienced test engineers to develop customized test scripts for a software or web application is prohibitively high for smaller software developers, which prevents these smaller software developers from competing effectively in the marketplace even when they are developing software and services that are useful and desirable to the public.

SUMMARY

In addition to the problems set forth in the background section, there are other reasons where an improved system and method of performing automated API testing are needed. For example, the increase in use of APIs has led to a need for large-scale automated testing of APIs. Such batch testing of a large number of APIs presents interesting opportunities which conventional API testing frameworks and tools, such as SoapUI, and Ping-API, fail to leverage. In some embodiments, by monitoring the progress of individual API tests, further stress tests can be sequenced for execution, some API tests can be suppressed based on a system load, behavior or response, and so on. Current tools fail to make use of the dynamic behavior of a system in response to an API test sequence. Some test frameworks do not support testing user interface (UI) tests with Web API tests. Some tools provide the ability to reuse tests (e.g., useful when rewriting tests) but do not support dynamic reuse of tests (e.g., tests for various scenarios).

The present disclosure describes a test system and method that addresses at least some of the shortcomings of conventional testing methods and systems identified above. In some embodiments, systems and methods are provided for ad-hoc batch testing of API tests starting with an API inventory (e.g., a listing of API references), test and/or validation data, and a dynamic framework (e.g., a test engine) for monitoring and testing various APIs (including SOAP and RESTful APIs). The API inventory system is more easily and efficiently developed compared to individual test scripts because it is a higher-level system that is untangled from specific variations of the software code used to write the APIs, and the dynamic testing framework provides several opportunities for optimizing and monitoring API test execution.

In accordance with some embodiments, a method is provided for ad-hoc batch testing of APIs. The method includes obtaining a plurality of API tests, and test data and validation data for the plurality of API tests. The method also includes performing validation for each test of the plurality of API tests. Performing the validation includes generating a test payload for the respective test. Generating the test payload includes determining an API reference corresponding to the respective test. Generating the test payload also includes obtaining relevant data from the test data according to a reference key in the respective test. Generating the test payload further includes generating input assignment operations for one or more input parameters in the API reference according to the relevant data, and generating an API call based on the API reference. Performing the validation further includes calling an endpoint corresponding to the respective test using the test payload. Performing the validation also includes receiving a response from the endpoint for the test payload. Performing the validation further includes validating the response according to the validation data. The method further includes generating and outputting one or more test reports based on the validated responses.

In some embodiments, performing the validation includes generating a first test payload for a first test of the plurality of API tests, calling a first endpoint corresponding to the first test using the first test payload, receiving a first response from the first endpoint for the first test payload, validating the first response according to the validation data, generating a second test payload for a second test of the plurality of API tests according to the first response, calling a second endpoint corresponding to the second test using the second test payload, receiving a second response from the second endpoint for the second test payload, and validating the second response according to the validation data.

In some embodiments, the method further includes selecting the second test according to a result of the validation of the first response.

In some embodiments, the method further includes obtaining an API inventory. Determining the API reference includes identifying the API reference corresponding to the respective test according to the API inventory.

In some embodiments, generating the input assignment operations includes generating database queries to fetch data from a database corresponding to the respective test.

In some embodiments, prior to calling the endpoint, the method includes obtaining an API inventory, and identifying the endpoint according to the API inventory.

In some embodiments, the method further includes obtaining a plurality of API test scenarios, each API test scenario including a respective one or more API tests from amongst the plurality of API tests, and performing the validation for each test corresponding to a first API test scenario before performing the validation for each test corresponding to a second API test scenario.

In some embodiments, the method further includes obtaining validation levels for each test of the plurality of API tests, and validating the response according to the validation level of the respective test. In some embodiments, the validation levels of the plurality of API tests include a first validation level, and validating the response includes, in accordance with a determination that the respective test corresponds to the first validation level, verifying if a status code in the response matches an entry in the validation data. In some embodiments, the validation levels of the plurality of API tests include a second validation level, and the method further includes, in accordance with a determination that the respective test corresponds to the second validation level, verifying if one or more data fields in the response matches one or more values in the validation data. In some embodiments, the validation levels of the plurality of API tests include a third validation level, the method further includes, in accordance with a determination that the test corresponds to the third validation level, verifying if a structure of the response matches a hierarchy in the validation data.

In some embodiments, validating the response comprises fetching data from a database corresponding to the respective test and comparing the data to the response.

In some embodiments, the validation is performed in parallel for each test of the plurality of API tests.

In some embodiments, each test of the plurality of API tests validates a REST API, or a SOAP API.

In some embodiments, the method further includes, in accordance with a determination that the API reference uses the HTTP protocol, determining one or more URL parameters for the API reference while generating the test payload.

In some embodiments, obtaining the plurality of API tests, and the test data and the validation data includes receiving one or more input files corresponding to the plurality of API tests; and extracting the plurality of API tests, the test data and the validation data from the one or more input files.

In some embodiments, obtaining the plurality of API tests, and the test data and the validation data further includes storing the plurality of API tests, the test data and the validation data into a database; and retrieving the plurality of API tests, the test data and the validation data from the database.

In some embodiments, the method further includes performing the validation for a first set of tests of the plurality of tests in parallel.

In accordance with some implementations, an electronic device has one or more processors and memory storing one or more programs executable by the one or more processors. The one or more programs include instructions for performing any of the methods described herein.

In accordance with some implementations, a non-transitory computer-readable storage medium has one or more processors and memory storing one or more programs executable by the one or more processors. The one or more programs include instructions for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures and specification.

FIG. 3B illustrates a sheet "APIInventory" in a workbook.

FIG. 3C illustrates a sheet "TestScenarios" in a workbook.

FIG. 3D illustrates a sheet "TestCases" in a workbook.

FIG. 3E illustrates a sheet "ResponseValidation" in a workbook.

FIG. 3F illustrates a sheet "ResponseValidation" in a workbook.

FIG. 3G illustrates a sheet "TestData" in a workbook.

DESCRIPTION OF EMBODIMENTS

Figure 1:
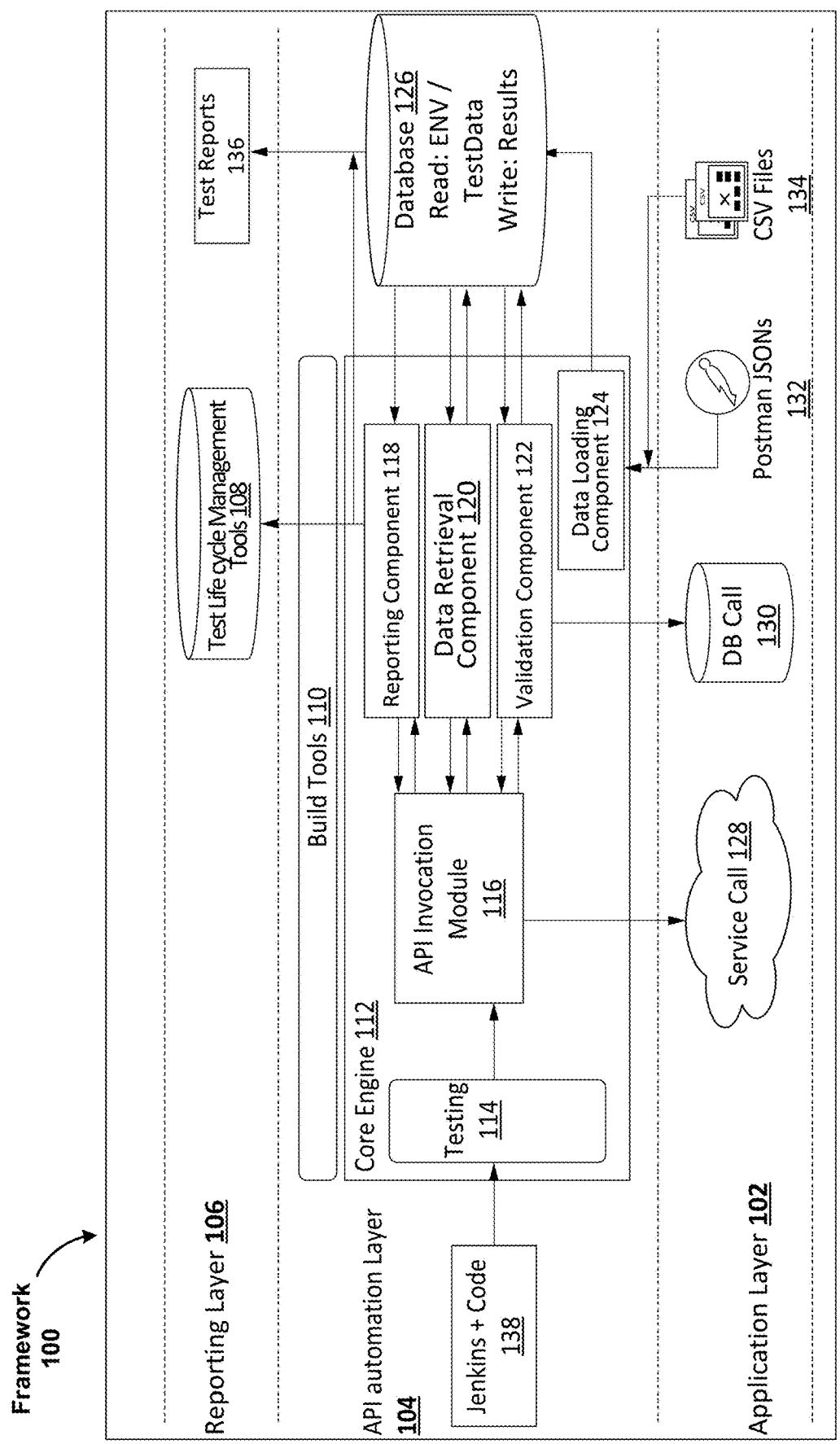
FIG. 1 is an architectural block diagram of an API test framework for ad-hoc batch testing of APIs in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, the term "if" means "when" or "upon" or "in response to determining" or "in response to detecting" or "in accordance with a determination that," depending on the context. Similarly, the phrase "if it is determined" or "if [a stated condition or event] is detected" means "upon determining" or "in response to determining" or "upon detecting [the stated condition or event]" or "in response to detecting [the stated condition or event]" or "in accordance with a determination that [a stated condition or event] is detected," depending on the context.

It will also be understood that, although the terms first, second, etc. are, in some instances, used herein to describe various elements, these elements should not be limited by these terms. These terms are used only to distinguish one element from another.

Conventionally, automated testing of web services or APIs entail the development of code and require setting up metadata and test data. Developing and maintaining individual test scripts tend to become onerous over time. The present disclosure describes a solution to this problem which uses a single script engine that is part of a testing framework. Data is input to the script engine and the script engine builds the requested payload with required test data, calls the end point, captures the response, validates the response content, and generates test reports. The script engine does not take prewritten test scripts and execute them to generate the API calls and does not automatically generate API test scripts (e.g., lines of executable instructions), but instead, directly generates the payload of the API calls and calls the end points to obtain the response (e.g., generating scriptless API calls).

FIG. 1 is an architectural block diagram of an API test framework 100 for ad-hoc batch testing of APIs in accordance with some embodiments. As illustrated, the framework 100 includes an application layer 102, an API automation layer 104, and a reporting layer 106. The different layers and/or the components are only used to illustrate a logical breakdown of the different tasks performed by the framework 100. The Application layer 102 includes at least a service call component 128 (e.g., a module to handle and/or forward web services call requests, such as REST service calls), a module 130 to handle calls or queries to databases, Postman JSON (JavaScript Object Notation) files 132, and spreadsheets or CSV (Comma-Separated Values) files 134, in accordance with some embodiments. The Postman JSON files 132 and spreadsheets or CVS files 134 contain data (e.g., test data, validation data, or any data associated with API testing, and/or database references to some or all of the above-mentioned data) specified by a user of the framework. The reporting layer 106 includes test lifecycle (or test case) management tools 108 to support, interface or integrate with test case management infrastructure, such as HP ALM (Application Lifecycle Management), CA Rally (an agile project management solution), or QA Symphony's qTest (a test case management tool), to track API testing status, according to some embodiments. In some embodiments, the test lifecycle management tools 108 is implemented as a database store that includes information to manage lifecycle of tests. The reporting layer 106 also includes test reports 136 in various formats (e.g., HTML reports that can be displayed or recalled in the user interface shown in FIG. 3A).

The API automation layer 104 includes at least a core engine 112, and a database 126 (e.g., a MongoDB used to read environment data or test data from, and write test results). In some instances, the database 126 is a NoSQL storage, such as MongoDB, that acts as a scalable data storage to drive the automation framework and stores historical test results. The API automation layer 104 also includes an automation server 138 (e.g., a Jenkins-based server) that manages the core engine 112 to automate testing of APIs, and a build tool support module 110, in accordance with some embodiments. The build tool support module 110 (e.g., Maven-, Gradle-, or Spring-based build automation) automates builds of generated API tests and, in some instances, captures dependencies between software components. In some instances (e.g., Maven), an XML file is used to describe the project that is to be built, the dependencies of the software with respect to third-party modules, any build order, as well as any required plugins. In some instances, the build tool support module 110 defines compilation tasks. In some instances, the build tool support module 110 downloads and caches libraries and/or plugins from repositories. In some embodiments, the build tool support module 110 supports multi-module build or parallel builds (e.g., to support parallel tests), incremental builds, and/or the ability to reuse compiled code.

In some embodiments, the core engine 112 includes a testing module 114 that acts as an interface to the automation server 138, and responds to test cues and shutdown requests. The core engine 112 also includes a reporting component 118 for reporting test results (e.g., either as output test reports 136, or to store the results of tests to the database 126). The core engine 112 also includes a data retrieval component 120 to retrieve needed data from the database 126, according to some embodiments. The core engine 112 further includes a validation component 122 to retrieve validation data from the database 126, and to validate response data for the APIs invoked by the API invocation module 116. In some instances, the validation component 122 executes database calls and/or generate database queries to retrieve reference data for validation against the responses for the APIs invoked by the API invocation module 116 (described below). In some embodiments, the validation component 122 validates response data at various testing levels (e.g., testing with increasing complexity, or testing according to test levels as specified by a user). In some embodiments, the core module 112 includes a data loading component 124 to extract data from Postman JSONs 132 and/or CSV or spreadsheets 134 supplied by a user of the framework 100. In some embodiments, at least some of the input files 132 and/or the spreadsheet or CSV files 134 are auto-generated by the framework 100 based on user-provided data or data in the database 126. For example, input files are generated for one set of API tests (e.g., as specified by a first user) and reused for another set of API tests (e.g., for API testing by a different user).

The core engine 112 includes an API invocation module 116 to run API tests. In some embodiments, the module 116 is based on REST Assured, a library used for testing and validation of REST APIs. In some embodiments, the module 116 supports invocation of various APIs (e.g., RESTful APIs and SOAP-based APIs). In some embodiments, the module 116 coordinates sequencing of API tests. In some embodiments, the module 116 coordinates execution of test scenarios and/or linked APIs. In some embodiments, the module 116 coordinates the passing of data between APIs. In some embodiments, the module 116 coordinates the validation of test response. Some embodiments use various other clients, such as RestSharp, CALISA, or combinations thereof. In some embodiments, the module 116 comprises Java code that can build a request payload (for testing an API) dynamically (e.g., by interacting with a JSON payload).

In some embodiments, a database server (e.g., a MongoDB Server) stores and supplies data collections that hold the environment, API, test and other data needed to perform API testing. Some of the advantages of this approach (e.g., transferring data from many Excel data sheets to a MongoDB) include the ability (i) to maintain data that is centralized, (ii) to use a standard data format, (iii) to support data that can be queried, and (iv) to support data format that can be easily written to or extended.

The framework 100 shown in FIG. 1 is merely illustrative. In accordance with various embodiments, the automated testing framework optionally includes fewer or more components and/or layers than framework 100, as a skilled person in the art would understand.

In accordance with the high-level logical organization of the framework 100, the following descriptions provide details of some of the operations and/or specific data structures used by the framework 100, in accordance with some embodiments.

In some embodiments, a data model is provided for use with the framework 100. In accordance with the data model, data required for API testing (i.e., data either input by the user or generated by the framework 100 according to user data) is categorized into a plurality of groups (e.g., six groups). In some embodiments, data for some of the groups (sometimes called select groups) is entered into a workbook (e.g., the CSV files 134; each group is represented as a sheet in an Excel workbook). Subsequently, this data is stored in the database 126 that acts as the data store for the data model. In some embodiments, the select groups are: test scenarios, test cases, an inventory of APIs, test data, and response validation data (sometimes called validation data). In some embodiments, data for the remaining one or more groups are imported into the database 126 in a specific format (e.g., as a JSON file; for raw test data, test scenarios, and test cases). In some embodiments, the specifically formatted file (e.g., the JSON file) is exported to a second format (e.g., a POSTMAN format, such as Postman Export V2.1). In some embodiments, a RESTClient (an application for talking to RESTful web services) uses the second format (sometimes called a request format) to communicate with an API endpoint or server, and the server responds to the request after performing the operations with results. In some embodiments, the remaining one or more groups include a group for recording past requests to the test system. In some embodiments, output or results of test execution are stored as part of a different group of data that also acts as historical data (for past executions of tests). In some embodiments, names of sheets in Excel workbooks and/or MongoDB collections match the group names for easy identification.

An example of the test scenarios group is provided below (Table I) for illustration. The first column indicates a label for a respective column in a worksheet, according to some embodiments. The second column describes the respective column, according to some embodiments. For example, the execution control column allows the user to specify to the test engine whether to execute a particular test scenario (sometimes called a scenario) listed in the input files, such that the user can easily customize the API testing when reusing the JSON files (e.g., no need to manually delete all components of the test scenario from the input files).

TABLE I

| Column | Description |
|---|---|
| Id | Unique identifier for each scenario - prefixed with the "ProjectSuite"/"AppName" |
| ScenarioName | Name of the scenario |
| TestCategory | Values to identify what level of validation has to be performed Acceptable Values: Basic, Standard, Premium |
| ExecutionControl | Control column to determine whether to execute a scenario - "Y"/"N" |
| DeleteFlag | Column to indicate whether a row is still active. - "Y"/"N" |

An example of the test cases group is provided below (Table II) for illustration. The first column indicates a label for a respective column in the worksheet, according to some embodiments. The second column describes the respective column, according to some embodiments. In some embodiments, the order of the tests is specified by a parameter (e.g., ScenarioOrder) in the input files, and utilized by the test engine to determine the sequential order of a test case, which optionally includes a sequence of multiple related API tests, relative to other test cases in a test scenario (e.g., a test scenario corresponding to a particular function of the software or web service).

TABLE II

| Column | Description |
|---|---|
| Id | Unique identifier for each test case (i.e., a test of an API) - prefixed with the "ProjectSuite"/"AppName" |
| TestCaseName | Name of the test case |
| ScenarioName | Name of the scenario that the test case is part of |
| ScenarioOrder | Order of the test cases in each of the Scenario - represented by a number |
| Feature | Logical grouping of APIs |
| TestCaseId | Test case ID in TFS |
| APIInventoryID | Reference/Key to the API Inventory Collection to fetch the API related information for the test case |
| TestDataID | Reference/Key to the Test Data collection - to fetch required data for the corresponding test case |
| ResponseValidationID | Reference/Key to the Response Validation ID to fetch relevant response validations to be done for the test case |
| DeleteFlag | Column to indicate whether a row is still active. - "Y"/"N" |

As shown in the table, the APIs are organized into logical groups. In some embodiments, the Id (or the identifier), TestCaseName, ScenarioName, ScenarioOrder, feature, TestCaseId, APIInventorID, TestDataID, and ResponseValidationID, provide convenient references to track and/or sort (or classify) API tests. Some fields in the table (e.g., DeleteFlag) are used to activate or suppress tests.

An example of the API inventory group is provided below (Table III) for illustration. The first column indicates a label for a respective column in the worksheet, according to some embodiments. The second column describes the respective column, according to some embodiments.

TABLE III

| Column | Description |
|---|---|
| Id | Unique identifier for each record in the API Inventory collection - prefixed with the "ProjectSuite" |
| Feature | Logical grouping of APIs as built by developers (similar to the Postman collection name) |
| APIName | Name of the API |
| HttpMethod | Type of API request |
| Endpoint | End point for the API - without the base path |
| StatusDescription | Description in the response that has to be validated EX: Status: Ok |
| SOAP Action | For SOAP based APIs mention the "SOAP Action" to be used; for REST APIs, leave blank |
| DeleteFlag | Column to indicate whether a row is still active. - "Y"/"N" |

An example of the test data group is provided below (Table IV) for illustration. The first column indicates a label for a respective column in the worksheet, according to some embodiments. The second column describes the respective column, according to some embodiments.

TABLE IV

| Column | Description |
| --- | --- |
| Id | Unique identifier for each record in the TestData collection - prefixed with the "ProjectSuite" |
| APIName | Actual API operation that is being performed |
| ScenarioName | Name of the scenario this Data row belongs to |
| URLParameters | URL parameters, if any, that have to be used as part of end Point |
| QueryParameters | Query parameters, if any, that have to be used as part of the end Point |
| RequestBodyParameters | Request Body parameters, if any, that have to be used as part of Body for an API => Colon separated expressions, each expression containing 'JSON Path'/Unique element along with input data separated by "=" |
| DBQueryParameters | Use DB query to retrieve Required TestData. Map as many response Key Elements to the columns retrieved by the DB Query. |
| DeleteFlag | Column to indicate whether a row is still active. - "Y"/"N" |

An example of the response validation group is provided below (Table V) for illustration. The first column indicates a label for a respective column in the worksheet, according to some embodiments. The second column describes the respective column, according to some embodiments.

TABLE V

| Column | Description |
| --- | --- |
| Id | Unique identifier for each record in the ResponseValidation collection - prefixed with the "ProjectSuite" |
| APIName | Actual API operation that is being performed |
| ScenarioName | Name of the scenario this Response Validation row belongs to |
| SaveVariableName | If a value from a response has to be used in subsequent Requests - use this variable to store the value |
| JSONPath | If JSON is the response format, provide the JSON Path to identify the value to be captured from the response |
| SQLQueryString | Query to be used to retrieve the data, so that it can be compared against Actual response value. This takes precedence over 'ResponseElementsValues' |
| VerifyDataInRow | In case of multiple rows retrieved, value specified here would determine which row to be used |
| ResponseElementsValues | Response values that have to be validated as part of the response Body (e.g., Colon separated expressions, each expression containing 'JSON Path'/Unique element along with expected data separated by "=") |
| DBQueryResponseValidation | Mapping between DB Column and the "Key" that has to be validated in the response |
| DeleteFlag | Column to indicate whether a row is still active. - "Y"/"N" |

An example algorithm for loading data and/or creating test data is described below for illustration. Some embodiments create one or more worksheets (sometimes called workbooks; e.g., Excel worksheets) as required for API testing. Some embodiments create postman collections required for the API testing. In some embodiments, a user provides the worksheets 134 and/or Postman collections 132. In some embodiments, if only a single test case for an API is required, one or more identifiers are used to link the test cases to entries in the JSON file (described above). For example, in reference to the tables above, some embodiments use the testcasename_request and testcasename_response (see description above) as the JSON names. In some embodiments, if multiple test cases for an API are required, and supposing all the test cases need a single request and/or response, then the APIName_request & APIName_response are used as the JSON names. On the other hand, if multiple test cases have to be created for an API, and if all the test cases need a different request and/or response, then some embodiments use the testcasename_request and testcasename_response as the JSON names.

Some embodiments load the workbook data 134 and/or Postman collections 132 into the database 126. Some embodiments execute a batch file to load the data and/or Postman collections into the database. Some embodiments pass an input parameter to an executable process to upload the concerned data to the database. Some embodiments load data according to a predetermined set of steps. In some embodiments, the steps include identification of a project suite corresponding to the data load (e.g., as identified by an Excel workbook name). In some embodiments, the steps also include deleting records in all collections of the database for the identified project suite (so that new records can be created). In some embodiments, the steps also include reading the records from the workbook or Excel data 134 as single worksheets of data. In some embodiments, the steps also include loading the records into each collection. In some embodiments, the steps further includes loading Postman collections into the requests collection. Some embodiments verify the data loaded into the database 126 (sometimes called a database collection).

Some embodiments provide an option (to a user of the framework 100) to perform validation of tests (or test scenarios) directly from one or more workbooks (e.g., the CSV files 134), to perform validation of tests from the database 126 after uploading data from the one or more workbooks to the database 126, and/or to execute tests from the database 126 directly (i.e., without uploading data from the workbooks 134). Some embodiments allow users to provide a test category (sometimes called a validation level) for the test. Some embodiments allow users to provide a test environment tag or identifier to initiate tests. Some embodiments allow users to control execution of tests after initiation of the tests. Based on the user-selected option, some embodiments fetch data from workbooks or worksheet and/or databases corresponding to the user-selected option. Some embodiments determine the corresponding scenario (or test scenarios) in the test scenarios collection (described above) based on the product value and test category. Some embodiments read tests cases (e.g., tests in the test cases collection described above) for each test scenario identified earlier.

In some embodiments, for each test case, the framework 100 identifies one or more APIs that are referenced by the test case. In some embodiments, the framework 100 identifies an HTTP method and/or details of an endpoint from the API inventory collection (described above). In some embodiments, the framework 100 identifies relevant data from the test data collection (described above). In some embodiments, the framework 100 identifies validation or assertion (e.g., by using the validation component 122) to be performed for the test case from the response validation collection. In some embodiments, the framework 100 identifies request payload for the test case (e.g., based on the 'testcasename' provided using the pattern "<testcasename>_request") from the requests collection. In some embodiments, if an entry is not found in the requests collection using the test case name (a more specific search fails), then the framework performs a more generic search (e.g., using "APIName_request" in the POSTMAN Request collection) to locate the test case.

In some embodiments, the framework 100 replaces the data for the input elements according to the data identified from the test data collection (as described above). In some embodiments, input test data for any request body is provided through request body parameters of the test data collection (described above). In some embodiments, data is provided in the format <Element>=<Value>. In some embodiments, multiple such data are separated by a ';'. In some embodiments, depending on the HTTP method defined for an API, the framework builds the URL and/or query parameters and request body.

In some embodiments, the framework 100 calls the end point identified from the API inventory collection using the request (sometimes called the payload or the request payload) that is created (as described above). In some embodiments, the framework 100 captures (or stores in the database 126) a response received (in response to the call to the endpoint). In some embodiments, the framework 100 validates the received data against expected data (sometimes called the validation data). In some embodiments, data is extracted from the response and stored so that the data can be passed to a subsequent API call. In some embodiments, if data has to be passed on to further API tests (e.g., tests in a scenario), the framework 100 provides the user with an option to specify (e.g., using a name of a variable specified for the option "SaveVariableName" and/or provide the occurrence of such value in the response under an option named "JSONPath").

In some embodiments, based on user input (e.g., value received for "Validationlevel" described above), the framework 100 performs a hierarchy of validations (sometimes called test levels or validation levels) using the validation component 122. For example, if the test category is basic, then the framework 100 verifies a status code in the response and/or marks the test as a pass or a fail depending on the test code. In some embodiments, if the test category is standard (or an intermediate level of testing), the framework 100 verifies the status code in the response, and verifies response element values in the response validation collection. For example, the framework 100 matches the key and values mentioned in the response elements values column against the actual response received. If both the key and value validations are successful, then the framework marks the test case as a pass or else as a fail. In some embodiments, the framework 100 performs the validations for multiples sets of validation data. For example, if the response element values are not mentioned, the framework uses a query string (e.g., SQLQueryString described above) to validate the tests. In some embodiments, if both response element values and query string are provided, the framework uses the query string. In some embodiments, if the test category is a premium (or an equivalent advanced level of validation), the framework 100 performs the validations corresponding to the standard or the basic level. Additionally, the framework 100 also verifies that the response structure or hierarchy of the actual response received with the expected response saved in the requests collection (described above). If the structure or hierarchy of actual and expected responses match, then the framework marks the test as a "Pass" or else the framework 100 marks the test a "Fail". In some embodiments, if the actual response includes repeated values (e.g., child elements repeat), only the first instance is verified and marked or tagged as a "Pass".

In some embodiments, the framework 100 logs test execution status (using the payload or request) to the results collection (described above) in the database 126.

In some embodiments, the framework 100 repeats the aforementioned steps (staring with the data load) for each test scenario until all test cases are completed. For example, the API invocation module 116 coordinates the sequencing of the tests until all the tests are completed. In some embodiments, the framework 100 invokes a server update (e.g., a Team Foundation Server or a TFS Update) once a test scenario execution is complete. The server update gets scenario results from the results collection in the database 126 and updates test status in the server storage. Some embodiments use a test plan identifier that is part of a configuration file provided by the user. Subsequent test reports can use the test plan identifier to report test results. In some embodiments, a report generation component or module fetches results from the database and publishes a report (e.g., an HTML report).

In some embodiments, if an element value from the actual response has to be validated against a database table, then the framework 100 generates (e.g., using the validation component 122) a query (sometimes called a database call; e.g., the calls 130) to fetch data from the database (e.g., based on SQLQuery String in the response validation collection described above). In some embodiments, the framework 100 ensures that the query fetches only one record (as opposed to multiple records) so that the response result can be validated accurately. In some embodiments, if the query returns more than one record, then the framework 100 validates against an "nth" row of the query (e.g., as specified in "VerifyDataInRow" in the response validation collection). In some embodiments, supposing the key value in the actual response and the database column are different, the framework 100 uses a mapping between the database column and the actual response (e.g., as specified in the DBQueryResponseValidation). In some embodiments, the mapping is specified using the mapping format <ActualResponseKey>=<DBColumnName>.

In some embodiments, test data for a request body can be provided through request body parameters of the test data collection (described above). In some embodiments, data is specified or hard coded (i.e., constant values are specified) in the test data collection. In some embodiments, instead of the user specifying values, data is chosen from the database 126. In some embodiments, the framework 100 lets the user specify the query to fetch data from the database under the DBQueryParameters in the test data collection (described above). In some embodiments, the data is provided in the format <Element>=[[QueryColumn] (with multiple data input separated by a terminal or a token, such as a ";"). In some embodiments, if the query is retrieving multiple columns, the user can specify the queries using database query formats (e.g., QueryColumn=Select DBCoumn from <TABLE> Where <Condition>, or QueryColumn1, QueryColumn2=Select DBColumn1,DBColumn2 from <TABLE> Where <Condition>).

As further illustration, the automation of sample web services APIs is described below, according to some embodiments. As an initial step, data is arranged across the data collections (described above; sometimes called the requests-response pairs). Suppose the framework is used to automate testing of the following APIs (the feature listed at the end corresponds to specific features of a user database that the API is supposed to access or modify):

MemberLookup—GET Request to retrieve all member data; Feature: members

AddDiagnostics—POST Request to add diagnostics information for a member; Feature: diagnostics CreateInquiry—POST Request to create an inquiry; Feature: Inquiries InquiryLookup—GET Request to retrieve an Inquiry; Feature: Inquiries This information is encoded in a table illustrated in FIG. 3B. The table illustrated in FIG. 3B is a sheet "APIInventory" in a workbook that includes sheets "TestScenarios", "TestCases", etc.

As illustrated, before receiving input or configuration data for automating the API testing, the following set of data is supplied to the framework 100 for each API or web service. The data shown in the table below is input to the API inventory collection (described above).

TABLE VI

| Id | Unique identifier for each row (works as a primary key) |
|---|---|
| APIName | Name of API |
| Feature | Module or Feature name |
| EndPoint | Service end point |
| HttpMethod | HTTP Method Type (Get/Put/Post/Delete/Patch) |
| StatusDescription | Response Status Code |
| SOAPAction | In case of SOAP services - "SOAPAction" name (if required) |
| DeleteFlag | Indicator to determine whether a row is still active: "Y" for inactive, "N" for active |

In some embodiments, the framework 100 uses the inventory to identify the scenarios and the respective test cases for the APIs. The following describes two scenarios for the above web services. Under the first scenario, for the validateMemberAPIs, the framework 100 retrieves member details using the "MemberLookup" API and validates the response. The framework 100 subsequently passes the memberID to the next API. Next, the framework invokes the "AddDiagnostics" API by passing the memberID received from the "MemberLookUp" API test and validates that the diagnostics information has been added to the concerned database. Under a second scenario, for the validateInquiryAPIs, the framework 100 creates an inquiry using the "CreateInquiry" API and validates the response. The framework 100 subsequently passes the RequestID (obtained from the result of the previous API) to an "InquiryLookup" API and validates that the request is generated and persisted (or committed to a database or storage).

In some embodiments, the framework 100 builds the test scenario worksheet and test cases work sheet by deriving the information from user provided data. In some embodiments, the test scenarios collection or worksheet resembles the format illustrated in the table shown in FIG. 3C. The table illustrated in FIG. 3C is a sheet "TestScenarios" in a workbook that includes sheets "TestScenarios", "TestCases", etc.

In some embodiments, the test cases worksheet or collection resembles the format illustrated in the table shown in FIG. 3D. The table illustrated in FIG. 3D is a sheet "TestCases" in a workbook that includes sheets "TestScenarios", "TestCases", etc.

The above tables illustrate references (or cross-references) to other collections. For example, there is a reference to the API inventory through an unique identifier (under the column APIInventoryID). Similarly, the columns labelled TestDataID and ResponseValidationID provide references to the test data and response validation collections (described above).

Figure 3A:
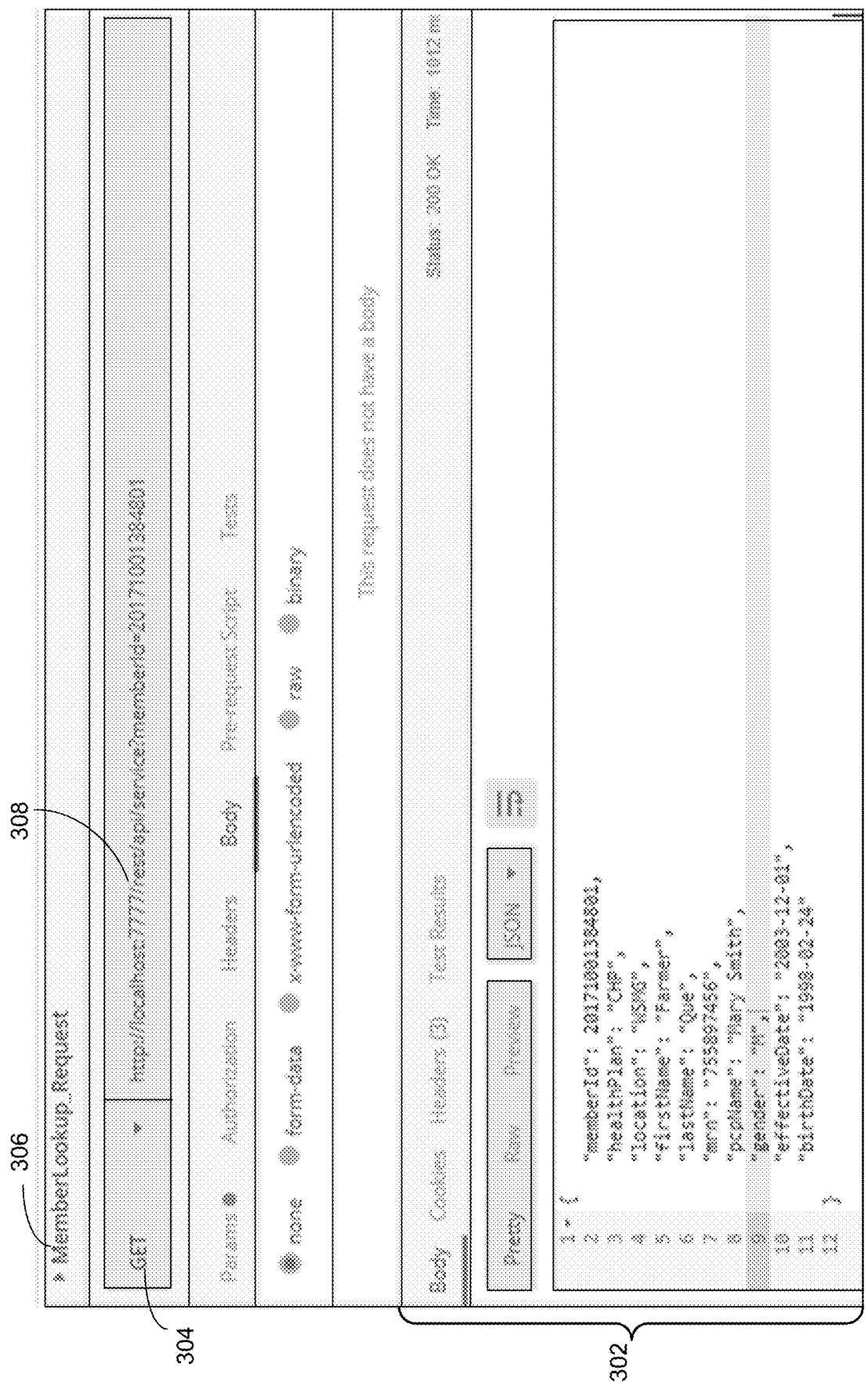
FIG. 3A illustrates an example user interface for displaying API test reports in accordance with some embodiments.

In some embodiments, the framework 100 builds a response validation collection data. An example of such response data 302 for the MemberLookup service of API (indicated as MemberLookup_Request 306) is illustrated in FIG. 3A, according to some embodiments. FIG. 3A illustrates an example interface for test reports in accordance with some embodiments. The API uses the HTTP protocol (the HTTP method is GET indicated by the label 304), and the URL parameter for the API is indicated by the label 308. As described above and below, in some embodiments, the framework 100 determines that the API is using the HTTP protocol, determines the method type, and/or determines the URL parameter. In the example interface shown in FIG. 3A, a user enters one or more information corresponding to an API test, including the expected response (sometimes called response validation collection data) for the API test. In some embodiments, the framework 100 generates the information automatically and populates and displays the information to the user.

As a further illustration, suppose the values for healthPlan, mrn and pcpName tags are to be validated in the response. Then the user specifies (or the system generates based on other user provided data and/or database information) response element values (under the column ResponseElementValues in the table shown in FIG. 3E). Each Element is separated by a semicolon (as described above; e.g., healthPlan=CHP; mrn=755897456; pcpName=Mary Smith). These features are illustrated in the table shown in FIG. 3E. The table illustrated in FIG. 3E is a sheet "ResponseValidation" in a workbook that includes sheets "TestScenarios", "TestCases", etc.

Figure 3F:
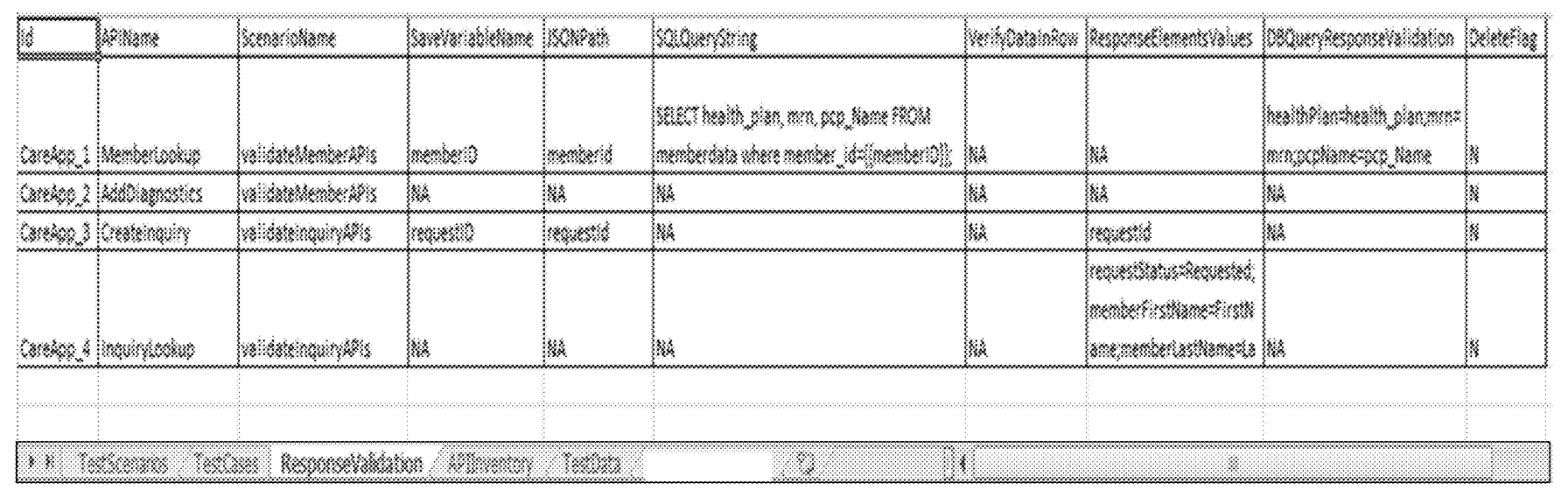

As another example, suppose the elements healthPlan, mrn and pcpName tags are to be validated in the response, but without the user specifying the exact "expected values". Instead of specific values, if the framework 100 has to retrieve the expected values dynamically from database (sometimes called a DB), then the user specifies (or the system generates based on other user provided information) the required DB query to be entered under "SQLQuery String". As explained above, a mapping between "Response element Keys" to be validated and the DB column names is specified by the user (or auto-generated by the framework based on other user-provided information) under "DBQueryResponseValidation", separated by semicolon, as illustrated in the table shown in FIG. 3F. The table illustrated in FIG. 3F is a sheet "Response Validation" in a workbook that includes sheets "TestScenarios", "TestCases", etc.

In some embodiments, the framework 100 optionally passes a response element value on to a subsequent test case (e.g., as input parameter or as a condition (e.g., a trigger condition or a bypass condition) for additional test cases in the same test scenario or a test case in a related test scenario), and the JSONPath of the element whose value is to be passed is optionally provided by the user (e.g., in the input files (e.g., under a DBQueryXXXX data group)) or generated by the system. Also, in some embodiments, the framework 100 uses a unique variable name (e.g., under "SaveVariableName" column, described above) to store the value that has to be passed. For example, for the running example, to pass "memberId" to a subsequent test, the JSONPath in the response is specified to be "memberId" and the framework 100 stores this value in the variable named "memberID".

Figure 3G:
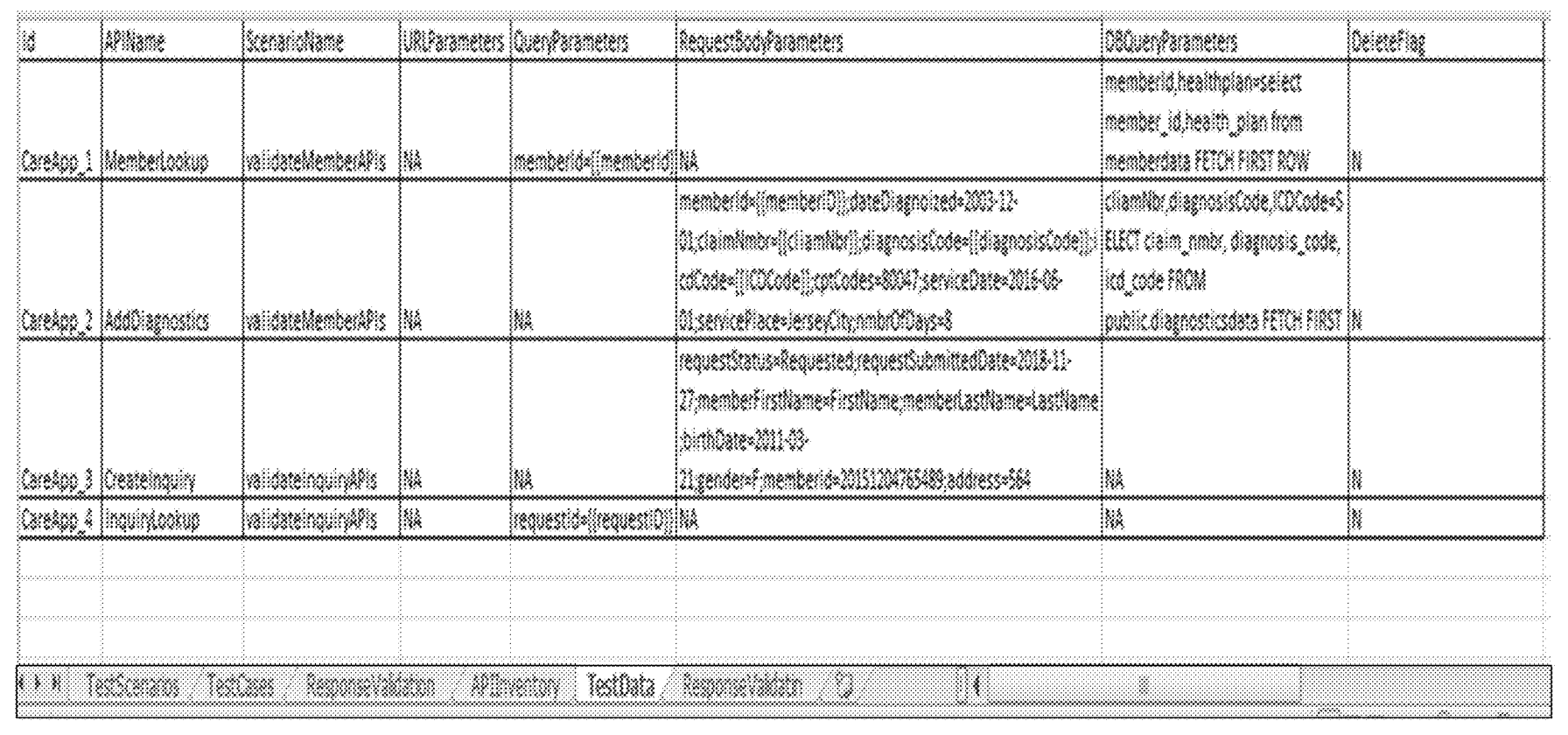

As a further illustration, the table shown in FIG. 3G illustrates a sample test data collection, according to some embodiments. The table illustrated in FIG. 3G is a sheet "TestData" in a workbook that includes sheets "TestScenarios", "TestCases", etc. QueryParameters is used to refer to the data required for endpoint URLs, RequestBodyParameters is used to refer to the data for the request body, and URLParameters is used to refer to the data for any URL level parameter.

Figure 2:
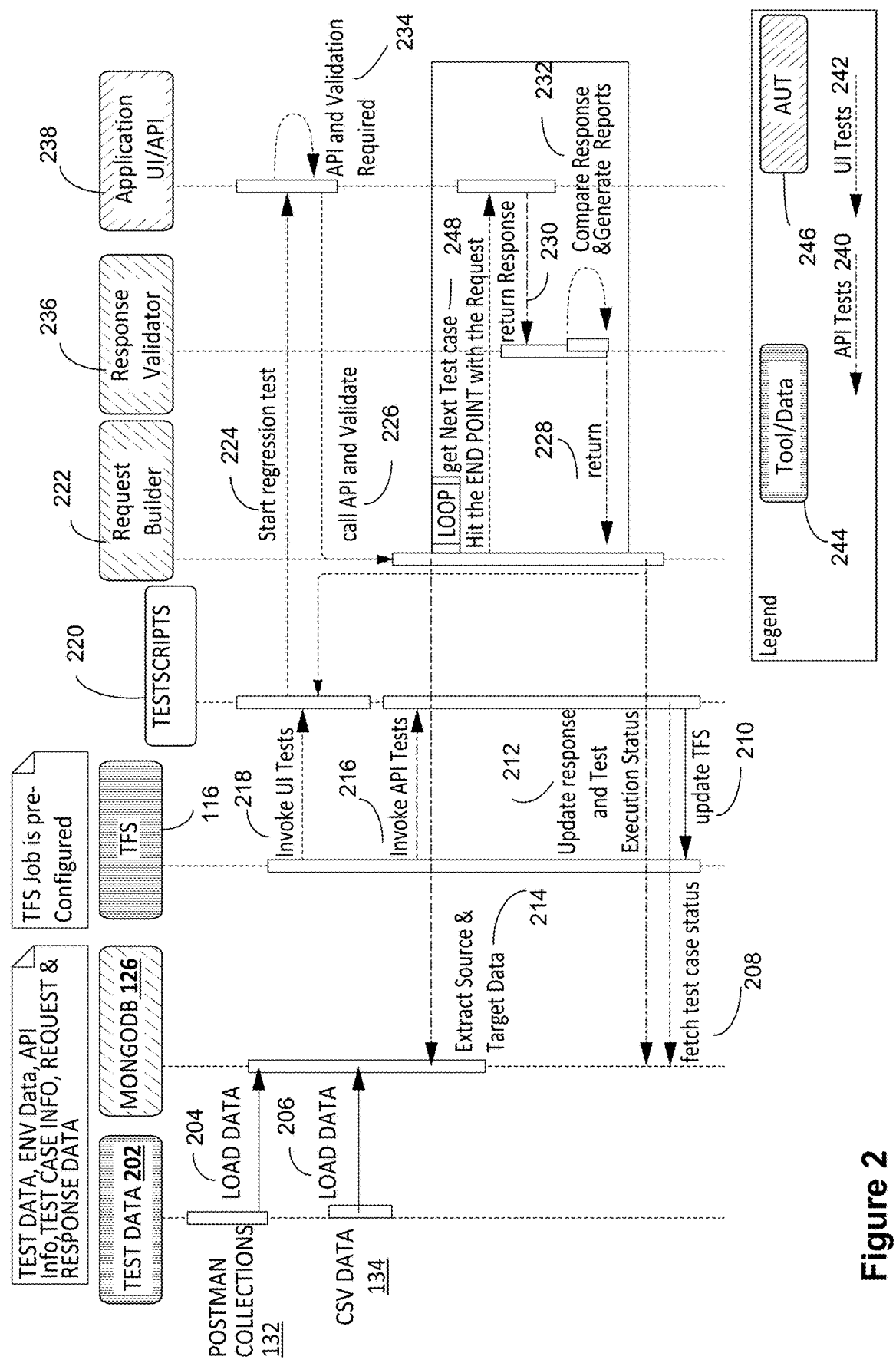
FIG. 2 is a representative sequence diagram of the API test framework in accordance with some embodiments.

FIG. 2 is a representative sequence diagram of the API test framework 100 in accordance with some embodiments. The sequence diagram illustrates the sequence of the operations (described above) of the framework 100 in accordance with some embodiments. Tool or input data are denoted by the vertical shades 244 and automated test framework modules (AUT) are shown by the pattern 246, as shown in the legend in the bottom of the figure. The organization of the components as tools and the automation test tests 246 is only shown for illustration purposes. The path of the API testing is shown by the dashed and dotted line 240 and the UI testing path is indicated by the dashed line 242.

The framework 100 loads (as part of operations 204 and 206) test data 202 (e.g., environment data, API information, test case information, request and response data from the postman collections 132 (sometimes called POSTMAN collections), and/or the CSV data 134) into the database 126, according to some embodiments. In some embodiments, a TFS job (e.g., a process in the API invocation module 116) is preconfigured to invoke (218) UI tests and/or invoke (216) API tests. The test scripts 220 (sometimes called a script engine) interfaces with application lifecycle management tools and databases (e.g., a JIRA database), and/or TFS module or job 116 (or Rally or HP ALM, in some embodiments) to start (224) regression tests (sometimes called a test case) and update results of the test execution. Suppose a UI test requires API and/or validation 234, an application UI/API module 238 returns to a request builder 222 to build and validate (226) an API call (sometimes called a request payload or a request). The request builder 222 is in a continuous loop as indicated by LOOP (that terminates only if there are no more tests to execute). Once next test case is identified, the request builder 222 calls or hits (248) an endpoint with the request. In this step, the call is not generated in response execution of an instruction in a prewritten test script for the test case (e.g., the entire API call is specified), but instead includes separately generating the payload of the request based on input data, replacing the generic parameter(s) of an identified API call for the test case with the generated payload; and sending the API call to an identified end point specified in the input file (e.g., end point is specified in a different data group from that of the API call type, and that of the test data). The application UI/API 238 returns (230) with a response which is processed by the response validator 236. In some instances, the request builder 222 also extracts (214) source and target data from the database 126 prior to calling the endpoint. In some instances, the request builder and/or the response validator 236 retrieves (not shown) data from the database 126 for validation. As shown, the response validator subsequently compares response and generates reports (shown by the operation 232), and returns (228) to the request builder 222.

Once all tests are completed and/or validated, the request builder 222 updates (212) response and test execution status in the database 126. In some embodiments, the request builder 222 also updates or returns the status to the test scripts 220 which updates (210) the TFS 116. For subsequent tests, the test scripts 220 (or any other component of the framework 100) fetches test case status 208 before starting new tests. Thus, the framework 100 can both sequence tests as well as pass results from one test (tests) to a subsequent test (or subsequent tests). In some embodiments, the test scripts 220 orchestrate tests and/or test scenarios, based on dynamic test results.

FIGS. 4A-4G provide a flowchart of a method 400 for ad-hoc batch testing of API tests, according to some embodiments. The method 400 is performed 404 by the framework 100 described above. In some embodiments, the framework 100 includes an electronic device having one or more processors and memory storing one or more programs configured for execution by the one or more processors. The method 400 includes obtaining (406) a plurality of API tests (e.g., in the form of test files), and test data (data used to test the API) and validation data (data used to validate the API) for the plurality of API tests. These operations were described above in reference to FIGS. 1 and 2. In some embodiments, the method 400 is used to test different APIs. In some embodiments, each test of the plurality of API tests validates (408) a REST API, or a SOAP API. It is important to understand that the API tests and test data are not obtained in a manner that is embedded in prewritten test scripts, e.g., as executable statements and variables in program codes written in a test script language. Instead, in some embodiments, the API tests and test data are specified in various input files in accordance with a data model, that separately lists different categories of input data, such as test scenarios (e.g., Table I described above), test cases (e.g., Table II described above), API inventories (e.g., Table III described above), test data (e.g., Table IV described above), response validation data (e.g., Table V described above), etc. This allows customizable automated test generation to be performed through the framework, without complicated test script coding by experienced test programmers.

Figure 4A:
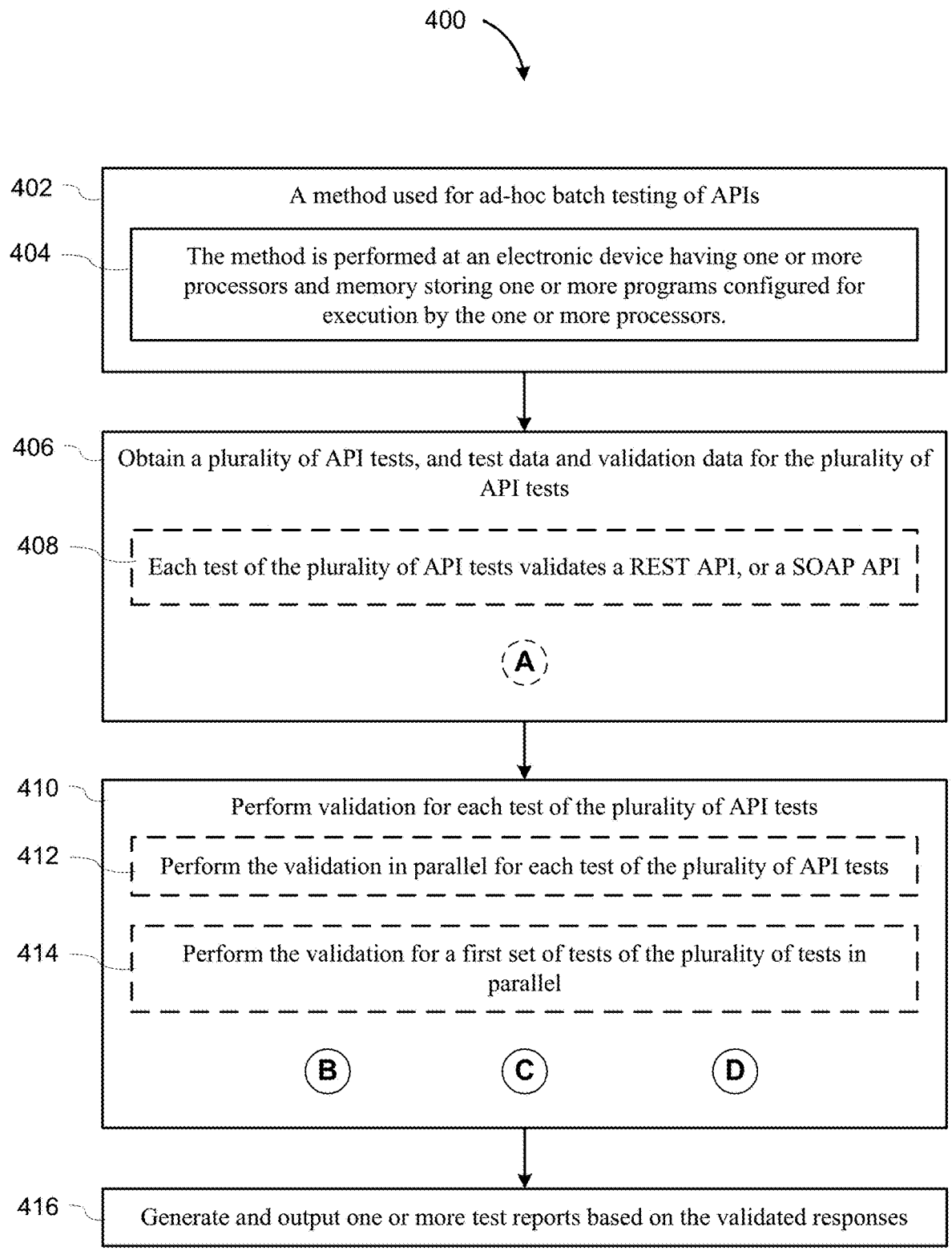
FIGS. 4A-4G are a flowchart of a method for ad-hoc batch testing of APIs, in accordance with some embodiments.
Figure 4B:
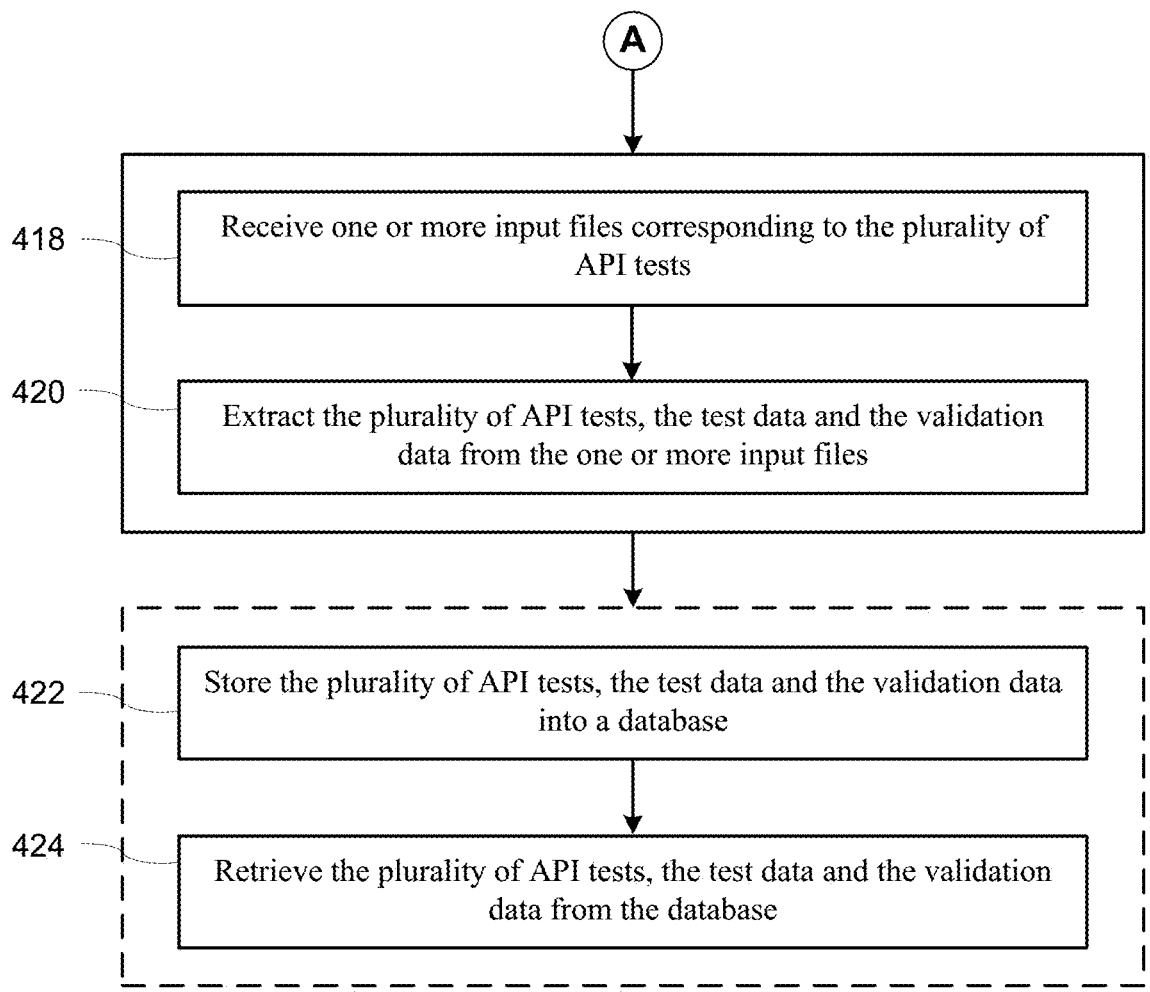

Referring next to FIG. 4B, in some embodiments, obtaining (406) the plurality of API tests, and the test data and the validation data includes receiving (418) one or more input files (e.g., the workbooks 136, the JSON files 132, and/or files that are manually input) corresponding to the plurality of API tests, and extracting (420) the plurality of API tests, the test data and the validation data from the one or more input files. In some embodiments, obtaining (406) the plurality of API tests, and the test data and the validation data further includes storing (422) the plurality of API tests, the test data and the validation data into a database (e.g., database 126); and retrieving (424) the plurality of API tests, the test data and the validation data from the database. An example of the test cases group is described above in reference to Table II, according to some embodiments.

Referring back to FIG. 4A, the method 400 includes performing (410) validation for each test of the plurality of API tests, after obtaining the plurality of API tests. In some embodiments, the validation is performed (412) in parallel for each test of the plurality of API tests (e.g., all tests, or tests for a particular test scenario, or tests for a particular test case for the test scenario). In some embodiments, the method 400 further includes performing (414) the validation for a first set of tests (e.g., less than all) of the plurality of tests in parallel (e.g., concurrently) (e.g., while performing the validation for a second set of tests of the plurality of tests in a serial fashion). In some embodiments, the framework permits the first set of tests (e.g., parallel tests, or serial tests) and the second set of tests (e.g., serial tests or parallel tests) to occur concurrently, in accordance with a determination that the first set of tests and the second set of tests corresponding to different test scenarios. In some embodiments, the first set of tests and the second set of tests correspond to different APIs.

Figure 4C:
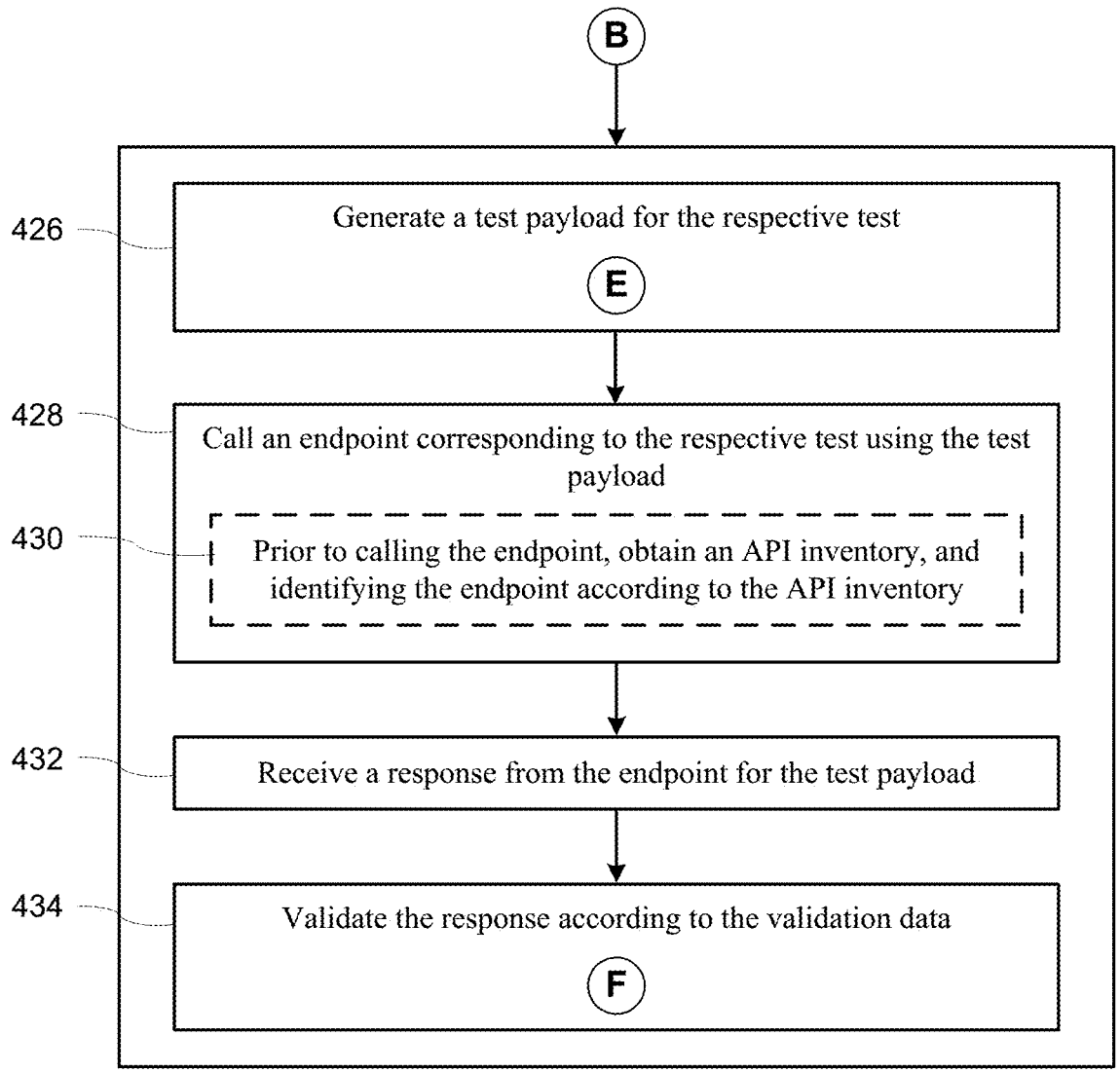
Figure 4D:
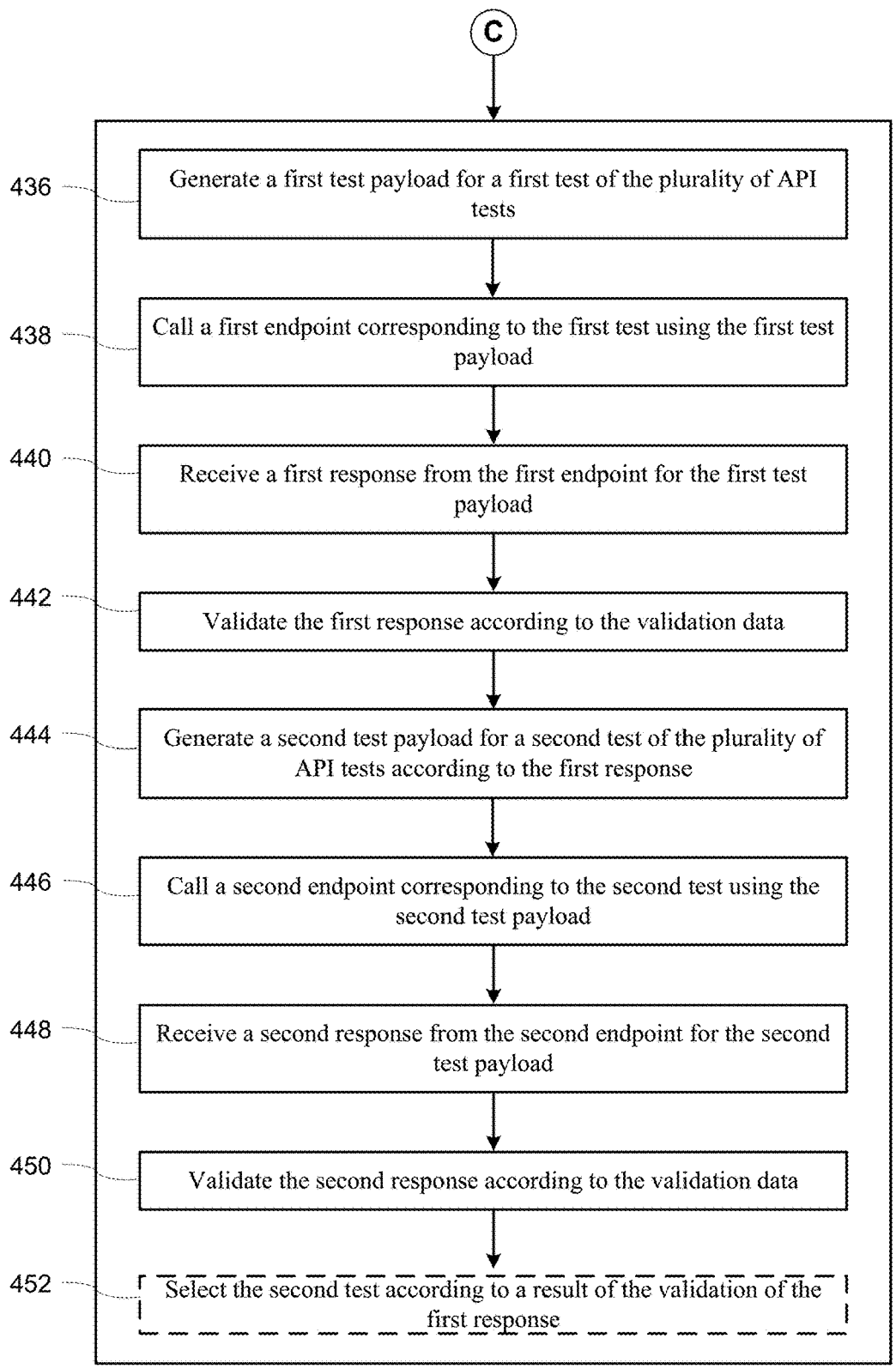
Figure 4E:
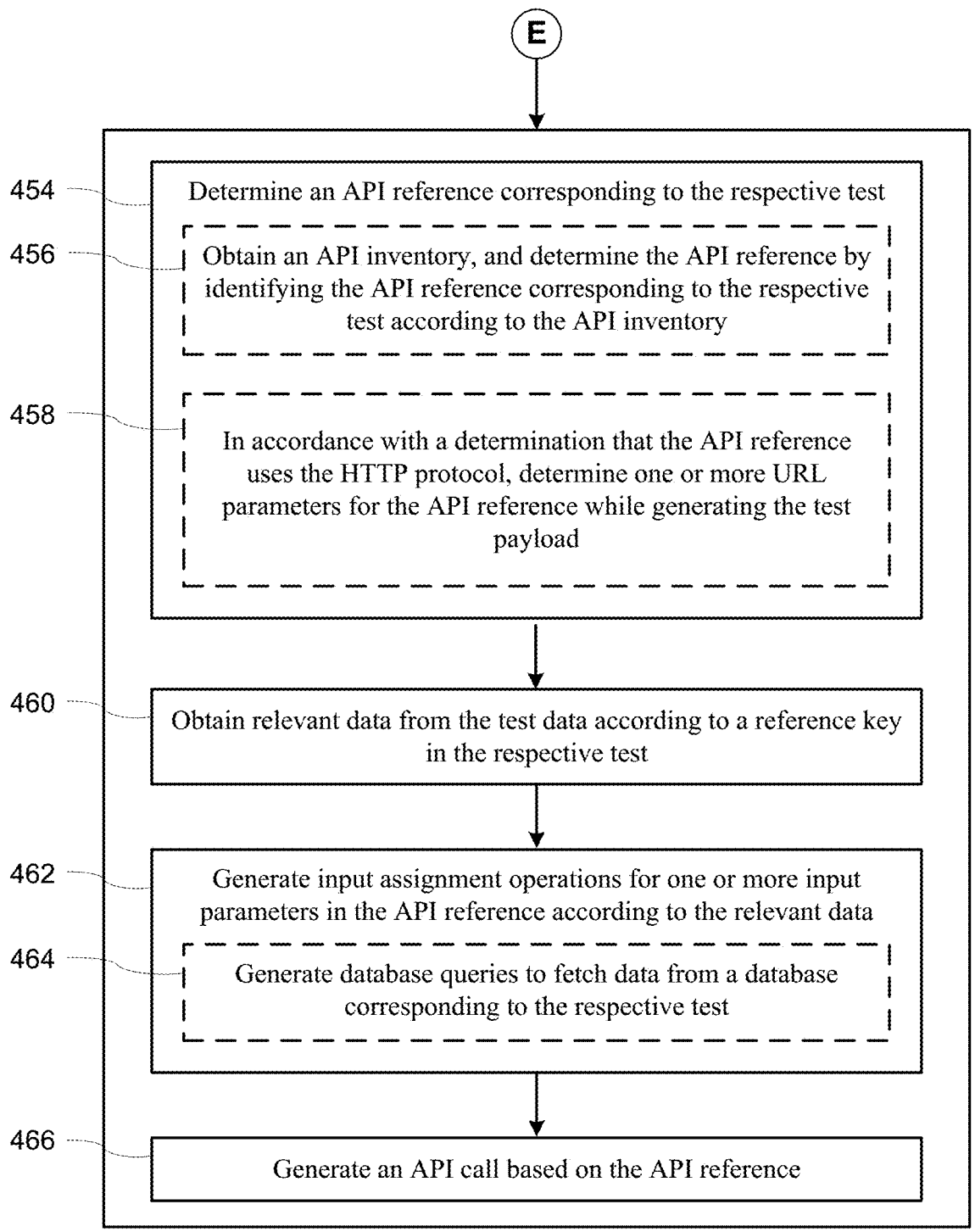
Figure 4F:
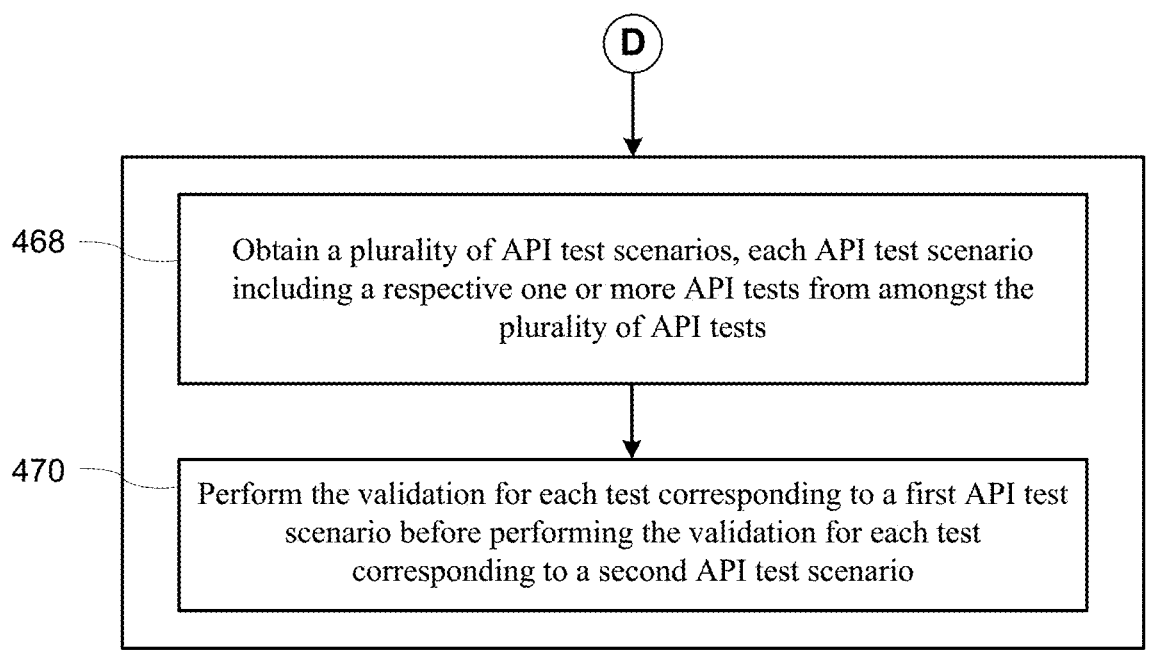

Referring next to FIG. 4F, in some embodiments, the method 400 further includes obtaining (468) a plurality of API test scenarios (e.g., validateMemberAPIs, validateInquiryAPIs). An example of the test scenarios group is described above in reference to Table I, according to some embodiments. Each API test scenario includes a respective one or more API tests from amongst the plurality of API tests (e.g., validateMemberAPIs includes testing MemberLookup API followed by AddDiagnostics API; e.g., validateInquiryAPIs includes testing CreateInquiry followed by InquiryLookup APIs), and performing (470) the validation for each test corresponding to a first API test scenario before performing the validation for each test corresponding to a second API test scenario. In some embodiments, the system uses the result obtained from testing an API in a respective test scenario in the testing of subsequent API in the respective test scenario.

Referring now back to FIG. 4C, performing the validation includes generating (426) a test payload (e.g., a payload is analogous to a code snippet (e.g., a sub-portion or sub-portions of a function or instruction) used to test the API) for the respective test. Referring next to FIG. 4E, generating the test payload includes determining (454) an API reference (e.g., retrieving an entry from an API inventory that has a signature, a declaration, for the API) corresponding to the respective test. In some embodiments, the method 400 further includes obtaining (456) an API inventory. Determining the API reference includes identifying the API reference corresponding to the respective test according to the API inventory. An example of the API inventory group is described above in reference to Table III, according to some embodiments.

Generating (426) the test payload includes obtaining (460) relevant data from the test data according to a reference key in the respective test. For example, the test possesses some keys for retrieving only the relevant data from the test data. An API may have N parameters, some of which are hardcoded as constants in the API test, and others are variables, and only suitable test values for the variables need to be collected from the test data. As an alternative, the API reference optionally provides a signature for the API that provides clues as to what the relevant data is. For example, a string that is a patient name directs the system to obtain patient names from the test dataset. An example of the test data group is described above in reference to Table IV, according to some embodiments.

Generating (426) the test payload further includes generating (462) input assignment operations for one or more input parameters in the API reference according to the relevant data (e.g., the assignment statements could be in the form of a series of statements like "variable X=value a", or "variable Y=fetch from database D"), and generating (466) an API call based on the API reference. In some embodiments, each payload ends with the API call preceded by the assignment statements which set up the input for the API call. In some embodiments, some tests can be negative tests. For example, some tests are generated to test the result when one or more input parameters are not set up properly. In some embodiments, some tests are performed as a load test as opposed to a functional test, or test performance of an API (e.g., relative to other APIs). In some embodiments, generating (462) the input assignment operations includes generating (464) database queries to fetch data from a database corresponding to the respective test. In some embodiments, the method 400 further includes, in accordance with a determination that the API reference uses the HTTP protocol, determining (458) one or more URL parameters for the API reference while generating the test payload.

Referring now back to FIG. 4C, performing the validation further includes calling (428) an endpoint corresponding to the respective test using the test payload. An endpoint corresponds to one end of a communication channel: when an API interacts with another system, the touchpoints of this communication are considered endpoints, and can include a URL of a server or service. In some embodiments, prior to calling the endpoint, the method includes (430) obtaining an API inventory, and identifying the endpoint according to the API inventory.

Performing the validation also includes receiving (432) a response from the endpoint for the test payload. In some instances, some tests verify lack of a response, or interpret lack of a response as a failure of the test. Some tests optionally include timers to time-out a test if the test takes too long to complete. Some negative tests optionally interpret receipt of a response when none is expected to mean a failed test.

Figure 4G:
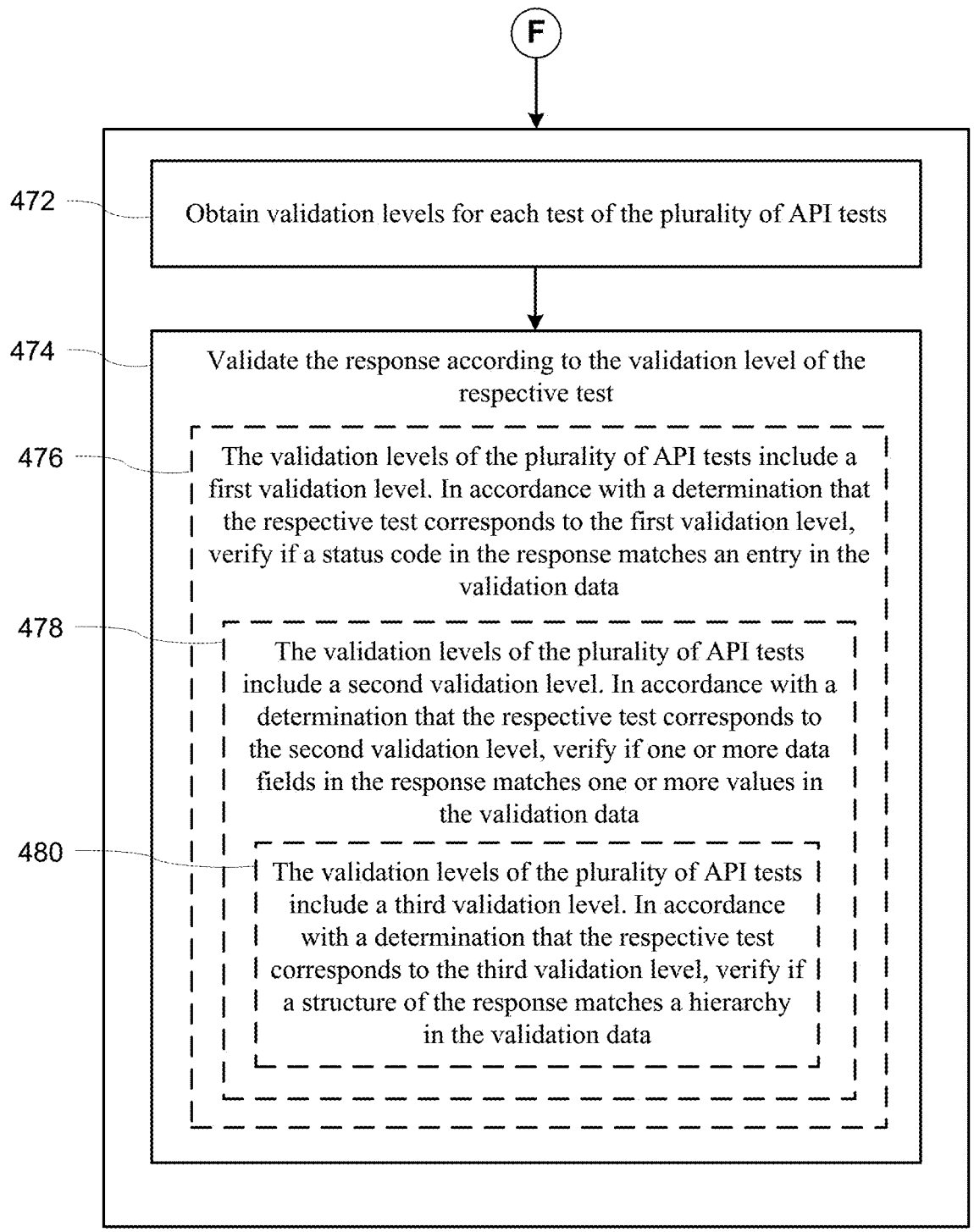

Performing the validation further includes validating (434) the response according to the validation data. The validation operations is optional for some tests (e.g., load tests). Referring next to FIG. 4G, in some embodiments, the method 400 further includes obtaining (472) validation levels (sometimes called test categories) for each test of the plurality of API tests, and validating (474) the response according to the validation level of the respective test. In some embodiments, the validation levels of the plurality of API tests include a first validation level (sometimes called a basic validation), and validating the response includes, in accordance with a determination that the respective test corresponds to the first validation level, verifying (476) if a status code in the response matches an entry in the validation data. In some embodiments, the validation levels of the plurality of API tests include a second validation level (sometimes called a standard validation level), the method 400 further comprising, in accordance with a determination that the respective test corresponds to the second validation level, verifying (478) if one or more data fields in the response matches one or more values in the validation data. In some embodiments, the validation levels of the plurality of API tests include a third validation level (sometimes called an advanced validation level), the method 400 further comprising, in accordance with a determination that the test corresponds to the third validation level, verifying (480) if a structure of the response matches a hierarchy in the validation data. In some embodiments, validating the response comprises fetching data from a database corresponding to the respective test and comparing the data to the response. An example of the response validation group is described above in reference to Table V, according to some embodiments.

Referring now back to FIG. 4D, in some embodiments, the method 400 includes sequencing or orchestration of the tests. In such embodiments, the validation includes generating (436) a first test payload for a first test of the plurality of API tests, calling (438) a first endpoint corresponding to the first test using the first test payload, receiving (440) a first response from the first endpoint for the first test payload, validating (442) the first response according to the validation data, and generating (444) a second test payload for a second test of the plurality of API tests according to the first response. Generating the next payload based on a received response for a prior test provides a basis for sequencing the test. As described above, lack of a response or a timeout triggers queuing a subsequent test or throttling the tests. In some embodiments, the system could sequence the tests apriori, i.e., without waiting for a response. In other words, because the framework 100 knows the entire suite of tests to be run (e.g., through parsing the input files), the tests can be categorized or grouped apriori. The validation further includes calling (446) a second endpoint corresponding to the second test using the second test payload. The first and the second endpoints are optionally distinct endpoints. In some embodiments, the system calls a second endpoint using the first test. Various other combinations are possible in accordance with various embodiments. The validation further includes receiving (448) a second response from the second endpoint for the second test payload. Some embodiments queue tests and receive an aggregated response (i.e., collect individual responses in a batch). The validation further includes validating (450) the second response according to the validation data. Some embodiments optionally batch validate responses. In some embodiments, the framework 100 dynamically selects tests, and the method 400 further includes selecting (452) the second test according to a result of the validation of the first response. For example, the validation response indicates a pass or a fail, and, in accordance with the validation response, a first set of tests are skipped/ignored, a second set of tests are selected (including the second test), and/or a cardinality of the next set of tests is/are determined.

Referring back to FIG. 4A, the method 400 further includes generating and outputting (416) one or more test reports based on the validated responses.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method for ad-hoc batch testing of APIs, the method comprising:
    obtaining a plurality of API tests, and test data and validation data for the plurality of API tests;
    categorizing, in accordance with a data model, data required for testing the plurality of API tests, into a plurality of groups including test scenarios, test cases, an inventory of APIs, the test data, and the validation data;
    performing validation for each test of the plurality of API tests, wherein performing the validation includes:
        generating a test payload for a respective test, wherein generating the test payload includes:
            determining an API reference corresponding to the respective test;
            obtaining relevant data from the test data according to a reference key in the respective test;
            generating input assignment operations for one or more input parameters in the API reference according to the relevant data; and
            generating an API call based on the API reference;
        calling an endpoint corresponding to the respective test using the test payload;
        receiving a response from the endpoint for the test payload; and
        validating the response according to the validation data; and
    generating and outputting one or more test reports based on the validated responses;
    wherein performing the validation comprises:
        generating a first test payload for a first test of the plurality of API tests;
        calling a first endpoint corresponding to the first test using the first test payload;
        receiving a first response from the first endpoint for the first test payload;
        validating the first response according to the validation data;
        selecting a second test according to a result of the validation of the first response, the result of the validation of the first response indicating whether the validation of the first response has passed or failed;
        generating a second test payload for the second test of the plurality of API tests according to the first response;
        calling a second endpoint corresponding to the second test using the second test payload;
        receiving a second response from the second endpoint for the second test payload; and
        validating the second response according to the validation data.

2. The method of claim 1, further comprising obtaining an API inventory, wherein determining the API reference comprises identifying the API reference corresponding to the respective test according to the API inventory.

3. The method of claim 1, wherein generating the input assignment operations comprises generating database queries to fetch data from a database corresponding to the respective test.

4. The method of claim 1, further comprising, prior to calling the endpoint, obtaining an API inventory, and identifying the endpoint according to the API inventory.

5. The method of claim 1, further comprising:
    obtaining a plurality of API test scenarios, each API test scenario including a respective one or more API tests from amongst the plurality of API tests; and
    performing the validation for each test corresponding to a first API test scenario before performing the validation for each test corresponding to a second API test scenario.

6. The method of claim 1, further comprising:
    obtaining validation levels for each test of the plurality of API tests; and
    validating the response according to the validation level of the respective test.

7. The method of claim 6, wherein the validation levels of the plurality of API tests include a first validation level, and validating the response comprises, in accordance with a determination that the respective test corresponds to the first validation level, verifying if a status code in the response matches an entry in the validation data.

8. The method of claim 7, wherein the validation levels of the plurality of API tests include a second validation level, the method further comprising, in accordance with a determination that the respective test corresponds to the second validation level, verifying if one or more data fields in the response matches one or more values in the validation data.

9. The method of claim 8, wherein the validation levels of the plurality of API tests include a third validation level, the method further comprising, in accordance with a determination that the test corresponds to the third validation level, verifying if a structure of the response matches a hierarchy in the validation data.

10. The method of claim 1, wherein validating the response comprises fetching data from a database corresponding to the respective test and comparing the data to the response.

11. The method of claim 1, wherein the validation is performed in parallel for each test of the plurality of API tests.

12. The method of claim 1, wherein each test of the plurality of API tests validates a REST API, or a SOAP API.

13. The method of claim 1, the method further comprising:
   in accordance with a determination that the API reference uses an HTTP protocol, determining one or more URL parameters for the API reference while generating the test payload.

14. The method of claim 1, wherein obtaining the plurality of API tests, and the test data and the validation data comprises:
   receiving one or more input files corresponding to the plurality of API tests; and
   extracting the plurality of API tests, the test data and the validation data from the one or more input files.

15. The method of claim 14, wherein obtaining the plurality of API tests, and the test data and the validation data further comprises:
   storing the plurality of API tests, the test data and the validation data into a database; and
   retrieving the plurality of API tests, the test data and the validation data from the database.

16. The method of claim 1, further comprising performing the validation for a first set of tests of the plurality of API tests in parallel.

17. An electronic device, comprising:
   one or more processors; and
   memory storing one or more programs for execution by the one or more processors, the one or more programs including instructions for:
      obtaining a plurality of API tests, and test data and validation data for the plurality of API tests;
      categorizing, in accordance with a data model, data required for testing the plurality of API tests, into a plurality of groups including test scenarios, test cases, an inventory of APIs, the test data, and the validation data;
      performing validation for each test of the plurality of API tests, wherein performing the validation includes:
         generating a test payload for a respective test, wherein generating the test payload includes:
            determining an API reference corresponding to the respective test;
            obtaining relevant data from the test data according to a reference key in the respective test;
            generating input assignment operations for one or more input parameters in the API reference according to the relevant data; and
            generating an API call based on the API reference;
         calling an endpoint corresponding to the respective test using the test payload;
         receiving a response from the endpoint for the test payload; and
         validating the response according to the validation data; and
      generating and outputting one or more test reports based on the validated responses;
   wherein performing the validation comprises:
      generating a first test payload for a first test of the plurality of API tests;
      calling a first endpoint corresponding to the first test using the first test payload;
      receiving a first response from the first endpoint for the first test payload;
      validating the first response according to the validation data;
      selecting a second test according to a result of the validation of the first response, the result of the validation of the first response indicating that the validation of the first response has passed or failed;
      generating a second test payload for the second test of the plurality of API tests according to the first response;
      calling a second endpoint corresponding to the second test using the second test payload;
      receiving a second response from the second endpoint for the second test payload; and
      validating the second response according to the validation data.

18. A non-transitory computer-readable storage medium storing one or more programs for execution by one or more processors of an electronic device, the one or more programs including instructions for:
   obtaining a plurality of API tests, and test data and validation data for the plurality of API tests;
   categorizing, in accordance with a data model, data required for testing the plurality of API tests, into a plurality of groups including test scenarios, test cases, an inventory of APIs, the test data, and the validation data;
   performing validation for each test of the plurality of API tests, wherein performing the validation includes:
      generating a test payload for a respective test, wherein generating the test payload includes:
         determining an API reference corresponding to the respective test;
         obtaining relevant data from the test data according to a reference key in the respective test;
         generating input assignment operations for one or more input parameters in the API reference according to the relevant data; and
         generating an API call based on the API reference;
      calling an endpoint corresponding to the respective test using the test payload;
      receiving a response from the endpoint for the test payload; and
      validating the response according to the validation data; and generating and outputting one or more test reports based on the validated responses;
wherein performing the validation comprises:
generating a first test payload for a first test of the plurality of API tests;
calling a first endpoint corresponding to the first test using the first test payload;
receiving a first response from the first endpoint for the first test payload;
validating the first response according to the validation data;
selecting a second test according to a result of the validation of the first response, the result of the validation of the first response indicating that the validation of the first response has passed or failed;
generating a second test payload for the second test of the plurality of API tests according to the first response;
calling a second endpoint corresponding to the second test using the second test payload;
receiving a second response from the second endpoint for the second test payload; and
validating the second response according to the validation data.

19. A method for ad-hoc batch testing of APIs, the method comprising:
obtaining a plurality of API tests, and test data and validation data for the plurality of API tests;
performing validation for each test of the plurality of API tests, wherein performing the validation includes:
generating a test payload for the respective test, wherein generating the test payload includes:
determining an API reference corresponding to the respective test;
obtaining relevant data from the test data according to a reference key in the respective test, wherein the reference key indicates if one or more parameters in the API reference are hardcoded as constants or variables that need to be collected from the test data;
generating input assignment operations for one or more input parameters in the API reference according to the relevant data; and
generating an API call based on the API reference;
calling an endpoint corresponding to the respective test using the test payload;
receiving a response from the endpoint for the test payload; and
validating the response according to the validation data; and
generating and outputting one or more test reports based on the validated responses.

20. The method of claim 19, further comprising obtaining an API inventory, wherein determining the API reference comprises identifying the API reference corresponding to the respective test according to the API inventory.

21. The method of claim 19, further comprising:
obtaining validation levels for each test of the plurality of API tests, wherein the validation levels of the plurality of API tests include a third validation level; and
validating the response according to the validation level of the respective test.

22. The method of claim 21, wherein the validation levels of the plurality of API tests include a first validation level, and validating the response comprises, in accordance with a determination that the respective test corresponds to the first validation level, verifying if a status code in the response matches an entry in the validation data.

23. The method of claim 22, wherein the validation levels of the plurality of API tests include a second validation level, the method further comprising, in accordance with a determination that the respective test corresponds to the second validation level, verifying if one or more data fields in the response matches one or more values in the validation data.

24. The method of claim 23, wherein the validation levels of the plurality of API tests include a third validation level, the method further comprising, in accordance with a determination that the test corresponds to the third validation level, verifying if a structure of the response matches a hierarchy in the validation data.

* * * * *